United States Patent
Kikuchi

(10) Patent No.: US 7,202,986 B2
(45) Date of Patent: Apr. 10, 2007

(54) LIGHT SCANNING UNIT

(75) Inventor: Susumu Kikuchi, Yokohama (JP)

(73) Assignee: Samsung Electronics Co., Ltd., Suwon (KR)

( * ) Notice: Subject to any disclaimer, the term of this patent is extended or adjusted under 35 U.S.C. 154(b) by 573 days.

(21) Appl. No.: 10/798,862

(22) Filed: Mar. 12, 2004

(65) Prior Publication Data

US 2004/0196511 A1 Oct. 7, 2004

(30) Foreign Application Priority Data

Apr. 3, 2003 (JP) .............................. 2003-100324

(51) Int. Cl.
*G02B 26/08* (2006.01)
(52) U.S. Cl. ..................................... 359/206
(58) Field of Classification Search ......... 359/204–208
See application file for complete search history.

(56) References Cited

U.S. PATENT DOCUMENTS

2004/0004748 A1* 1/2004 Kawabata et al. .......... 359/216

* cited by examiner

*Primary Examiner*—Euncha P. Cherry
(74) *Attorney, Agent, or Firm*—Roylance, Abrams, Berdo & Goodman, L.L.P.

(57) ABSTRACT

A light scanning unit for adjusting image magnification and beam diameter and having a simple structure and a low-priced multi-beam shape is provided. The light scanning unit includes a composite light source in which a plurality of light sources for emitting coherent light having different wavelengths are arranged adjacent to one another and an optical axis of each light source is arranged almost parallel and which emits light at a divergence angle centering on each optical axis. An optical system comprises a collimator lens which is arranged on an approximately central axis of an optical axis of each light source constituting the composite light source and collimates the light beam emitted from the composite light source. The optical system also comprises a cylinder lens for condensing the light beam emitted from the collimator lens, and a polygonal rotating mirror for scanning the light beam condensed by the cylinder lens in a main scanning direction on an exposed surface of an exposed object. The optical system further includes an optical element, which splits light beams with respect to different wavelengths after being reflected on the polygonal rotating mirror so as to radiate a light beam in the main scanning direction on the exposed surface of the exposed object different in each coherent light having each wavelength using the polygonal rotating mirror, and an F-θ lens arranged on a light path between the optical element and the polygonal rotating mirror, and in an optical path length from a reflective surface of the polygonal rotating mirror to the exposed surface of the exposed object, an optical path length of a light beam having a short wavelength is different from an optical path length of a light beam having a long wavelength.

4 Claims, 2 Drawing Sheets

LIGHT SCANNING UNIT

BACKGROUND OF THE INVENTION

This application claims the priority of Japanese Patent Application No. 2003-100324, filed on Apr. 3, 2003, in the Japanese Intellectual Property Office, the disclosure of which is incorporated herein by reference in its entirety.

1. Field of the Invention

The present invention relates to a light scanning unit. More particularly, the present invention relates to a light scanning unit suitable for an exposure device for an electrophotographic apparatus, such as a color printer having a plurality of exposed objects.

2. Description of the Related Art

An electrophotographic exposure devices can be categorized into devices that use a laser diode and devices that use a light emitting diode (LED). Devices that use an LED typically perform an exposure process by mapping one LED on 1 dot of a pixel of an image to be recorded in an exposed object. In general, devices using the LED use a light source called an LED head in which a plurality of LEDs are arranged.

The light source is configured in such a manner so as to arrange an LED chip in which a plurality of LED's are formed on a substrate and to form a plurality of LED arrays. Japanese Patent Publication No. Hei 10-035011 (published on Feb. 10, 1998) entitled "Light Emitting Diode Array and Fabrication thereof" discloses this type of configuration. The disclosed apparatus condenses light on an image-formed surface by arranging an optical system between an LED and an exposed surface of an exposed object.

In addition, devices using a laser diode scana laser beam in a main scanning direction on an exposed surface of an exposed object using a light scanning unit.

Devices using a laser diode use an F-θ lens to maintain the same scanning speed and the same beam shape on an exposed surface. Japanese Patent Publication No. Hei 09-096769 (published on Apr. 8, 1997) entitled "Method and Device for adjusting Optical Axis of Optical Scanner and Optical Scanner" discloses this type of configuration.

In the disclosed apparatus, a laser beam emitted from a laser diode is diffused light, and the laser beam is collimated by a collimator lens. The shape of the collimated laser beam is restricted in a slit, and the laser beam is condensed by a cylinder lens in a subscanning direction on a reflective surface of a polygonal rotating mirror which is a light scanning unit. Subsequently, light scanned in a main scanning direction on the polygonal rotating mirror is condensed by an F-θ lens (or lens group) on the exposed surface of an exposed object and is scanned at a uniform speed.

An electrophotographic exposure device using an LED can be made smaller. However, devices using an LED have known problems. First, a plurality of LED chips need to be precisely arranged on a substrate. Second, the circuit is complex. Third, due to the characteristics of an optical system, the distance from each LED chip to an exposed surface of an exposed object should be precise. Fourth, the degree of nonuniformity of light quantity between LED chips needs to be corrected.

In addition, in order to scan a laser diode light source using a polygonal rotating mirror onto an exposed surface, the spot of light projected onto an exposed surface is small, a circuit is relatively simple, and the depth of a focus is deep. As a result, the distance precision with respect to an exposed surface is comparatively low.

Meanwhile, recently, color electrophotographic printers has been developed rapidly. In particular, electrophotographic printers need to form an image four times, compared to a conventional black/white printer, so as to form an image having four colors, such as cyan, magenta, yellow, and black, into one color image.

Electrophotographic color printers can be categorized into two types. They are single pass electrophotographic color printers and multi-pass electrophotographic color printers. The single pass electrophotographic color printer mounts one exposure device in one drum, performs a development process using a four-color developer, superimposes an image on an intermediate transfer body, and transfers the superimposed image onto a sheet of paper.

The multi-pass electrophotographic color printer mounts four developers and four exposure devices, and four photosensitive bodies. Thus, the multi-pass electrophotographic printer is mechanically like four conventional black/white printers superimposed on one another.

In the single pass electrophotographic color printer, the output speed is reduced to ¼, so as to superimpose an image four times, such that the single pass electrophotographic color printer has a low speed. Also, the mechanism for moving a developer is complex. However, the single pass electrophotographic color printer can configure a photosensitive drum and an exposure device as a single body.

The printing speed of the multi-pass electrophotographic color printer is fast. However, the multi-pass electrophotographic color printer requires four exposure devices and four photosensitive bodies and thus, the structure becomes complex.

The present invention relates to an exposure device for a multi-pass electrophotographic color printer.

A conventional multi-pass electrophotographic color printer has the same number of laser diodes as the number of exposed objects and also requires the same number of polygonal rotating mirrors or F-θ lenses as the number of exposed objects. As a result, the size of an apparatus becomes large, and the costs of manufacture are increased.

In addition, in general, the refractive index of light beams is varied by the wavelength of light traversing a lens. If the wavelength of light is shortened, the refractive index of the light beam is increased. If light beams having different wavelengths are incident on the same lens, the light beam having a short wavelength is focused at a short distance, while the light beam having a long wavelength is focused at a longer distance. Thus, in order to allow light having a short wavelength and light having a long wavelength to have the same beam diameter, a focal distance of light having a long wavelength needs to be adjusted before and after the focal distance of light having a short wavelength.

In addition, since the main scanning magnification of a light beam having a short wavelength is reduced in the same position, a large correction of the main scanning magnification is needed. In order to realize large magnification correction, large correction, such as large-modulating of a data period or varying of a data width, is needed.

SUMMARY OF THE INVENTION

Embodiments of the present invention provide a light scanning unit for properly adjusting the image magnification and beam diameter when a plurality of light beams having different wavelengths are used in the same optical system. Embodiments of the present invention also have a simple structure and a low-priced multi-beam shape.

According to an aspect of the present invention, there is provided a light scanning unit, the light scanning unit comprising a composite light source in which a plurality of light sources for emitting coherent light having different wavelengths are arranged adjacent to one another. An optical axis of each light source is arranged almost parallel. The composite light source emits light at a divergent angle centering on each optical axis. The light scanning unit also comprises an optical system comprising a collimator lens which is arranged on an approximately central axis of the optical axis of each light source constituting the composite light source, a cylinder lens for condensing the light beam emitted from the collimator lens, a polygonal rotating mirror for scanning the light beam condensed by the cylinder lens in a main scanning direction on an exposed surface of an exposed object. The optical system also comprises an optical element which splits light beams with respect to different wavelengths after being reflected on the polygonal rotating mirror so as to radiate a light beam in the main scanning direction on the exposed surface of the exposed object different in each coherent light having each wavelength using the polygonal mirror, and an F-θ lens arranged on a light path between the optical element and the polygonal rotating mirror, and in an optical path length from a reflective surface of the polygonal rotating mirror to the exposed surface of the exposed object, an optical path length of a light beam having a short wavelength is different from an optical path length of a light beam having a long wavelength. In the optical path length from the reflective surface of the polygonal rotating mirror to the exposed surface of the exposed object, the optical path length of the light beam having a short wavelength is larger than the optical path length of the light beam having a long wavelength.

The optical element includes a half mirror, which splits a light beam emitted from the composite light source, and a band pass filter, which transmits only a light beam having a predetermined wavelength of each of light beams split by the half mirror.

BRIEF DESCRIPTION OF THE DRAWINGS

The above aspects and advantages of the present invention will become more apparent in connection with a detailed description of an exemplary embodiment thereof with reference to the attached drawing figures in which.

Throughout the drawing figures it should be understood that like reference numerals are intended to refer to like features and structures.

DETAILED DESCRIPTION OF THE INVENTION

Figure 1:
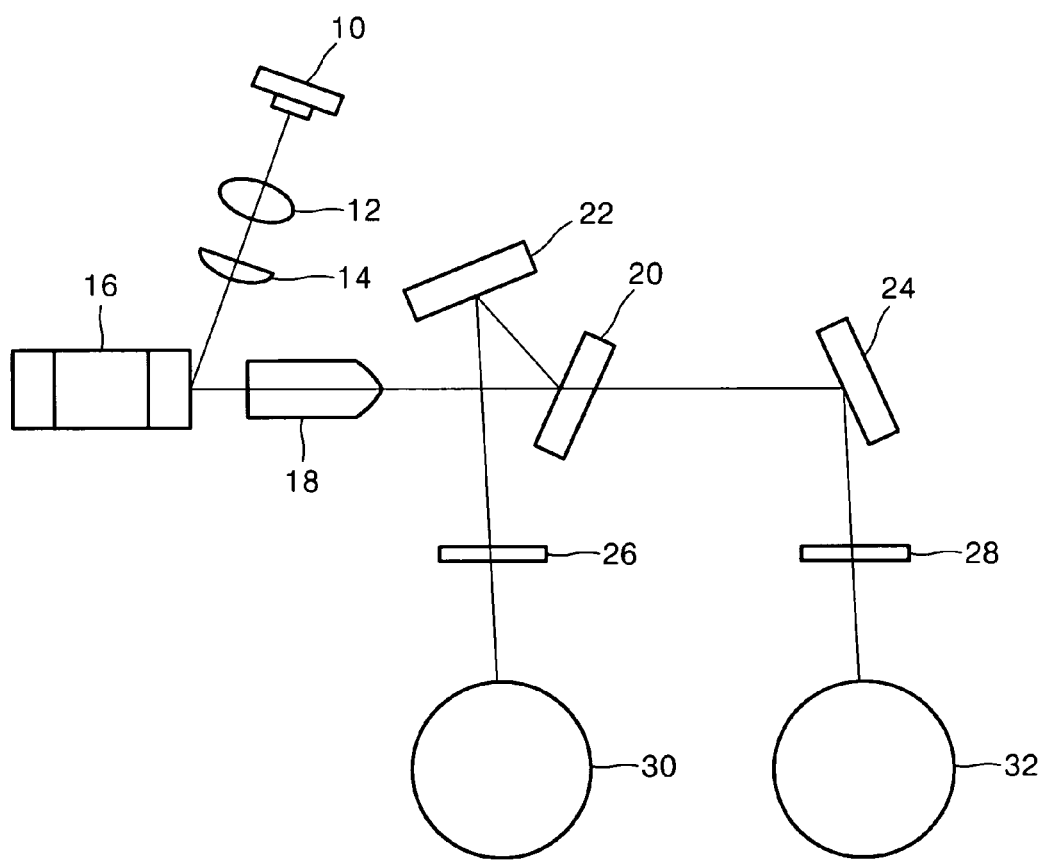
FIG. 1 schematically shows an optical arrangement of a light scanning unit according to an embodiment of the present invention.

Referring to FIG. 1, a light scanning unit according to an embodiment of the present invention includes a composite light source 10 for emitting a plurality of (in the exemplary embodiment, two) coherent lights having different wavelengths, a collimator lens 12, a cylinder lens 14, a polygonal rotating mirror 16, an F-θ lens 18, a half mirror 20, mirrors 22 and 24, a first band pass filter 26, and a second band pass filter 28.

In the present embodiment, the composite light source 10 is a multi-beam laser diode for emitting two light (coherent light) beams having different wavelengths (for example, wavelengths of 650 nm and 780 nm). The two laser diodes are preferably arranged adjacent to each other. The distance between the light sources of the two laser diodes, that is, the distance between optical axes, is preferably within 1 mm, for example.

The collimator lens 12 collimates a light beam emitted from the composite light source 10.

In addition, the cylinder lens 14 condenses a light beam onto a reflective surface of the polygonal rotating mirror 16. The cylinder lens 14 has power for performing a focusing function only in a subscanning direction of exposed objects 30 and 32 with respect to a transmitted light beam and does not have power in a main scanning direction. Here, the subscanning direction thereof is a rotational direction of the exposed objects 30 and 32, and the main scanning direction thereof is an axial direction of the exposed objects 30 and 32.

The polygonal rotating mirror 16 is rotated and driven by a driving unit (not shown) at a predetermined angular velocity and scans an incident light beam in the main scanning direction of exposed surfaces of the exposed objects 30 and 32 according to its rotation.

The F-θ lens 18 is arranged on an optical path between the polygonal rotating mirror 16 and an optical element. In other words, the F-θ lens 18 condenses a light beam having a long wavelength of 780 nm onto the exposed surface of the exposed object 32 and radiates the condensed light beam to uniformly scan.

In addition, the first band pass filter 26 transmits only a light beam having a short wavelength of 650 nm, and the second band pass filter 28 transmits only a light beam having a long wavelength of 780 nm.

Figure 2:
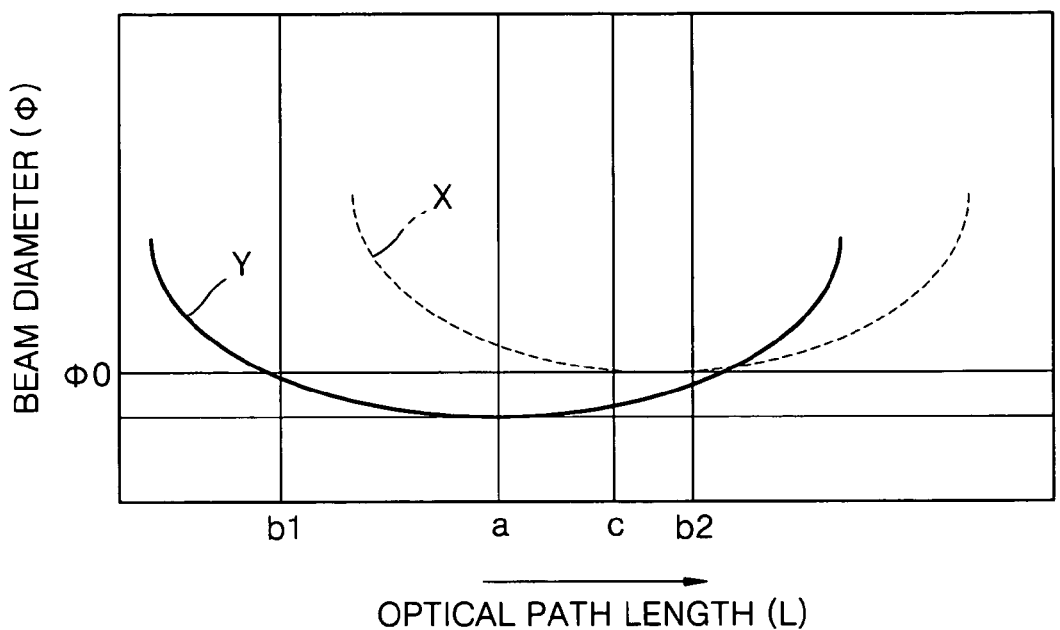
FIG. 2 is a graph of optical path length L from a reflective surface of a polygonal rotating mirror to exposed surfaces of exposed objects versus beam diameter of light velocity of a composite light source in the light scanning unit shown in FIG. 1.

Here, an optical path length from a reflective surface of the polygonal rotating mirror 16 to an exposed surface of an exposed object is L, and the beam diameter of a light beam is $\Phi$. The relation between the optical path length L and the beam diameter $\Phi$ is shown in FIG. 2. In FIG. 2, a curve X shows the characteristic of a light beam having a long wavelength of 780 nm, and a curve Y shows the characteristic of a light beam having a short wavelength of 650 nm.

In the light scanning unit according to an embodiment of the present invention, the beam diameters of light beams on the exposed surfaces of the exposed objects 30 and 32 which are image-formed surfaces of the optical system, are made almost the same as the beam diameters of a light beam having a long wavelength of 780 nm and a light beam having a short wavelength of 650 nm. To this end, based on the light beam having a long wavelength of 780 nm, the beam diameter $\Phi$ of the light beam having a long wavelength becomes minimum when the optical path length L is expressed as L=c (hereinafter, referred to as $L_m$) and the beam diameter $\Phi$ is expressed as $\Phi=\Phi_0$.

The beam diameter $\Phi$ of the light beam having a short wavelength is expressed as $\Phi=\Phi_0$ when $L=b_1$ or $L=b_2$ ($b_1<b_2$). Here, if the optical path length L is selected as $L=b_1$, image magnification is reduced. Thus, the optical path length $L_n$ of the light beam having a short wavelength is set so that image magnification is larger than the optical path length of the light beam having a long wavelength as expressed as $L=b_2$. Thus, the relation between the optical path length $L_m$ of the light beam having a long wavelength and the optical path length $L_n$ of the light beam having a short wavelength is expressed as $L_m \cdot L_n$.

Figure 3:
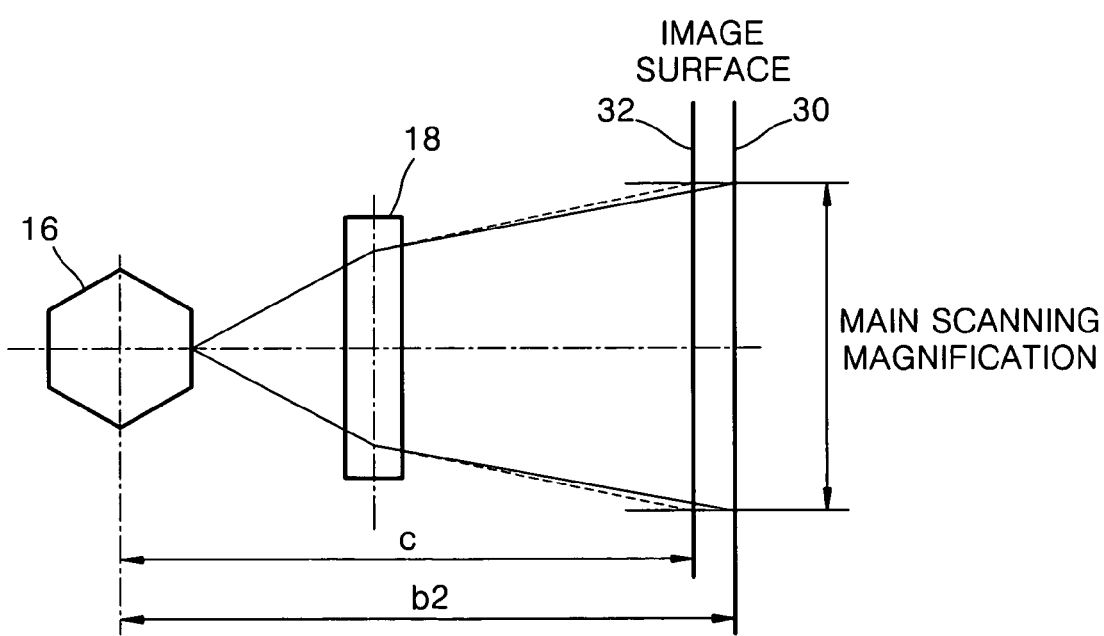
FIG. 3 shows the relation between the optical path length from the reflective surface of the polygonal rotating mirror to the exposed surfaces of the exposed objects and main scanning magnification.

FIG. 3 shows the relation between the optical path length from the reflective surface of the polygonal rotating mirror 16 to the exposed surfaces of the exposed objects 30 and 32 and main scanning magnification. In addition, image magnification is corrected by an optical unit (not shown) or electrical data modulation as occasion demands.

In this way, the optical path length of a light beam having a short wavelength is larger than the optical path length of a light beam having the longest wavelength such that image magnification and beam diameter needed to form light beams having different wavelengths as an image on exposed objects using same optical system are optimized.

In addition, the half mirror 20 and the first band pass filter 26 and the half mirror 20 and the second band pass filter 28 correspond to optical elements for splitting a light beam with respect to each different wavelength, according to an embodiment of the present invention.

In addition, the exposed objects 30 and 32 are preferably photosensitive drums, for example, and are rotated and driven by a driving unit (not shown) in a subscanning direction.

In the above structure, two light beams having different wavelengths are intensity-modulated by a modulation unit (not shown) according to information on different images and are emitted from the composite light source 10. The two light beams are emitted at a divergence angle centering on an optical axis.

The light beams emitted from the composite light source 10 are collimated by the collimator lens 12. And, the collimated light beams are focused by the cylinder lens 14, and are condensed onto the reflective surface of the polygonal rotating mirror 16.

The light beams reflected by the polygonal rotating mirror 16 are incident on the half mirror 20 through the F-θ lens 18. The light beams incident on the half mirror 20 are split into two parts.

A first portion of the split light beams is reflected on the mirror 22, and then is irradiated on the exposed surface of the exposed object 30 through the first band pass filter 26 and is scanned in the main scanning direction on the exposed surface of the exposed object 30 according to rotation of the polygonal rotating mirror 16.

Here, the optical path length $L_n$ from the reflective surface of the polygonal rotating mirror 16 through which a light beam having a short wavelength of 650 nm passes to the exposed surface of the exposed surface 30 is set as $L_n = b_2$, as described above. And, the optical path length $L_m$ from the reflective surface of the polygonal rotating mirror 16 through which a light beam having a long wavelength of 780 nm passes to the exposed surface of the exposed surface 30 is set as $L_m = a$. Since only the light beam having a short wavelength of 650 nm is transmitted from the first band pass filter 26, the light beam having a short wavelength of 650 nm is condensed onto the exposed surface of the exposed object 30 by the F-θ lens 18 and is scanned to uniform speed in the main scanning direction of the exposed surface.

In addition, a second portion of the light beams split into two parts by the half mirror 20 is irradiated on the exposed surface of the exposed object 32 through the mirror 24 and the second band pass filter 28 and is scanned in the main scanning direction on the exposed surface of the exposed object 32 according to rotation of the polygonal rotating mirror 16. Here, since only a light beam having a long wavelength of 780 nm is transmitted from the second band pass filter 28, the light beam having a long wavelength of 780 nm is condensed onto the exposed surface of the exposed object 30 by the F-θ lens 18 and is scanned to uniform speed in the main scanning direction of the exposed surface.

In this way, information on different images is recorded by a light beam having a short wavelength on the exposed surface of the exposed object 30, and information on different images is recorded by a light beam having a long wavelength on the exposed surface of the exposed object 32.

As described above, in the light scanning unit according to an embodiment of the present invention, a composite light source for emitting a plurality of light beams having different wavelengths is used as a light source. An optical system of the light scanning unit scans each light beam emitted from the light source in a main scanning direction of a corresponding exposed object. The light beams having different wavelengths. An optical path length is defined as the distance from a reflective surface of a polygonal rotating mirror to an exposed surface of the exposed object. The optical path length of a light beam having a short wavelength is larger than the optical path length of a light beam having a long wavelength, such that image magnification and beam diameter are properly adjusted when the plurality of light beams having different wavelengths are formed as an image using the same optical system. In addition, the configuration of the light scanning unit can advantageously be simplified, and a light scanning unit having a low-priced multi-beam shape can be implemented.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A light scanning unit comprising:
   a composite light source in which a plurality of light sources for emitting coherent light having different wavelengths are arranged adjacent to one another and an optical axis of each light source is arranged almost parallel and which emits light at a divergence angle centering on each optical axis; and
   an optical system comprising a collimator lens which is arranged on an approximately central axis of an optical axis of each light source constituting the composite light source and collimates the light beam emitted from the composite light source, a cylinder lens for condensing the light beam emitted from the collimator lens, a polygonal rotating mirror for scanning the light beam condensed by the cylinder lens in a main scanning direction on an exposed surface of an exposed object, an optical element, which splits light beams with respect to different wavelengths after being reflected on the polygonal rotating mirror so as to radiate a light beam in the main scanning direction on the exposed surface of the exposed object different in each coherent light having each wavelength using the polygonal rotating mirror, and an F-θ lens arranged on a light path between the optical element and the polygonal rotating mirror, and
   wherein, in an optical path length from a reflective surface of the polygonal rotating mirror to the exposed surface of the exposed object, an optical path length of a light beam having a short wavelength is different from an optical path length of a light beam having a long wavelength.

2. The light scanning unit of claim 1, wherein the optical element includes:
   a half mirror, which splits a light beam emitted from the composite light source; and
   a band pass filter, which transmits only a light beam having a predetermined wavelength of each of the light beams split by the half mirror.

3. The light scanning unit of claim 1, wherein, in the optical path length from the reflective surface of the polygonal rotating mirror to the exposed surface of the exposed object, the optical path length of the light beam having a short wavelength is larger than the optical path length of the light beam having a long wavelength.

4. The light scanning unit of claim 1, wherein the optical element includes:
   a half mirror, which splits a light beam emitted from the composite light source; and
   a band pass filter, which transmits only a light beam having a predetermined wavelength of each of the light beams split by the half mirror.

* * * * *